(12) United States Patent
Nguyen (10) Patent No.: US 11,835,743 B2
(45) Date of Patent: Dec. 5, 2023

(54) INNOVATIVE SOLUTIONS TO IMPROVE LASER DAMAGE THRESHOLDS OF OPTICAL STRUCTURES

(71) Applicant: Lawrence Livermore National Security, LLC, Livermore, CA (US)

(72) Inventor: Hoang T. Nguyen, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 149 days.

(21) Appl. No.: 17/172,979

(22) Filed: Feb. 10, 2021

(65) Prior Publication Data

US 2021/0263201 A1    Aug. 26, 2021

Related U.S. Application Data

(63) Continuation-in-part of application No. 16/698,555, filed on Nov. 27, 2019, which is a continuation-in-part of application No. PCT/US2018/034497, filed on May 24, 2018.

(60) Provisional application No. 62/514,707, filed on Jun. 2, 2017.

(51) Int. Cl.
 *G02B 5/18* (2006.01)
(52) U.S. Cl.
 CPC ......... *G02B 5/1847* (2013.01); *G02B 5/1833* (2013.01)
(58) Field of Classification Search
 CPC ...... G02B 5/1847; G02B 1/11; G02B 5/1833; G02B 1/113; G02B 1/115; G02B 5/18; G02B 5/1838; G02B 5/1861; G02B 5/1866; G02B 5/20; G02B 5/208; G02B 5/28; G02B 5/283; G02B 5/285; G02B 5/286; G02B 27/42; G02B 27/4294
 USPC ....... 359/576, 350, 359, 558, 566, 569, 572, 359/577, 580, 586, 588, 589, 590
 See application file for complete search history.

(56) References Cited

U.S. PATENT DOCUMENTS

| 5,907,436 A | 5/1999 | Perry et al. |
| 6,173,001 B1 * | 1/2001 | Zayhowski ......... H01S 3/08059 385/31 |
| 2005/0181131 A1 | 8/2005 | Linares et al. |
| 2007/0085447 A1 | 4/2007 | Larson, III |

(Continued)

FOREIGN PATENT DOCUMENTS

| CN | 102529214 A | 7/2012 |
| CN | 109811409 B | 1/2021 |

(Continued)

OTHER PUBLICATIONS

International Search Report and Written Opinion dated Jun. 24, 2021 in Application No. PCT/US2020/060801 in 10 pages.

(Continued)

*Primary Examiner* — Arnel C Lavarias
(74) *Attorney, Agent, or Firm* — Knobbe Martens Olson & Bear LLP (57) ABSTRACT

Optical structures, including thin film designs and components with topography, are provided that achieve significantly improved laser damage thresholds and/or ultra-low-loss. These advances may be achieved by utilizing a bulk window including a material having a band gap that is at least 5.0 eV and a thickness. The bulk window can be configured to increase the laser induced damage threshold of the underlying optical structure.

20 Claims, 7 Drawing Sheets

(56) References Cited

U.S. PATENT DOCUMENTS

| | | |
|---|---|---|
| 2007/0267135 A1 | 11/2007 | Kim et al. |
| 2012/0164454 A1 | 6/2012 | Sung |
| 2012/0269483 A1 | 10/2012 | Mossberg et al. |
| 2014/0261628 A1 | 9/2014 | Meitl et al. |
| 2016/0111223 A1 | 4/2016 | Bryant et al. |
| 2017/0047707 A1 | 2/2017 | Hamilton et al. |
| 2017/0269263 A1 | 9/2017 | Khan et al. |
| 2018/0202069 A1 | 7/2018 | Pan et al. |
| 2020/0096684 A1 | 3/2020 | Nguyen |

FOREIGN PATENT DOCUMENTS

| | | |
|---|---|---|
| EP | 2994784 B1 | 3/2019 |
| KR | 10-2007-0120491 A | 12/2007 |
| WO | WO 01/39286 A1 | 5/2001 |
| WO | WO 2018/222504 A2 | 12/2018 |
| WO | WO 2019/027913 A1 | 2/2019 |
| WO | WO 2019/031786 A1 | 2/2019 |
| WO | WO 2020/069261 A1 | 4/2020 |
| WO | WO 2021/118763 A2 | 6/2021 |
| WO | WO 2022/174245 A1 | 8/2022 |

OTHER PUBLICATIONS

International Search Report and Witten Opinion dated Nov. 30, 2018 in Application No. PCT/US2018/034497 in 10 pages.
International Search Report and Written Opinion dated Jun. 9, 2022 in Application No. PCT/US2020/060801 in 7 pages.
International Search Report and Written Opinion dated Jun. 3, 2020 in Application No. PCT/US22/70613 in 14 pages.

\* cited by examiner

INNOVATIVE SOLUTIONS TO IMPROVE LASER DAMAGE THRESHOLDS OF OPTICAL STRUCTURES

CROSS-REFERENCE TO RELATED APPLICATIONS

This application is a continuation-in-part of U.S. application Ser. No. 16/698,555 titled "Innovative Solutions for Improving Laser Damage Performance of Multi-Layer Dielectric Gratings," filed Nov. 27, 2019, incorporated herein by reference, which is a continuation-in-part of PCT/US2018/034497 titled "Innovative Solutions for Improving Laser Damage Performance of Multi-Layer Dielectric Gratings," filed May 24, 2018, incorporated herein by reference. PCT/US2018/034497 claims the benefit of U.S. Provisional Patent Application No. 62/514,707 titled "Innovative Solutions for Improving Laser Damage Performance of Multi-Layer Dielectric Gratings," filed Jun. 2, 2017, incorporated herein by reference.

STATEMENT REGARDING FEDERALLY SPONSORED R&D

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND

Field

The present disclosure relates to optical structures (such as thin films, multi-layer dielectric coatings, coated optics, gratings, reflective coatings, meta surface structures, etc.), and more specifically, it relates to techniques to improve the laser damage performance of such optical structures.

Description of the Related Art

In high power laser devices and systems, one of the major concerns deals with the damage threshold of the optical components. The laser induced damage threshold (LIDT) of the optical components (e.g., thin film coatings on optical components, gratings, etc.) is usually the limiting factor of such devices. The higher the laser damage threshold of the optic, the higher the potential output of the laser can be. In many optical systems—from the simplest to the most complex—optical thin films and/or gratings can play a critical role. Optical films and/or gratings can tailor any one or more of the reflective, transmissive, polarizing and dispersive properties of the optics, and greatly influence the overall performance of optical systems and instruments. In high-power applications, thin-film dielectric coatings and/or gratings are especially important because they are often the limiting factor driving performance. Historically, large laser systems used in the military, laser fusion and industrial welding and cutting have dominated the high-power industry. Many of these systems are based on nonlinear optical technology that involves high peak powers to increase or maximize frequency conversion. Other systems, such as those used in the semiconductor industry for repair and testing, employ high power to produce localized microscopic heating or cutting. The optics used in these laser systems can benefit from any one or more of the following features: low losses, high efficiency, low absorption, precise spectral optical properties and high laser damage thresholds.

Many factors influence laser damage in optics. One of the most common causes of catastrophic failure is the absorption of energy through gross defect sites on the coating itself. Thus, surface preparation (including polishing) and coating quality are major factors that limit performance. Energy absorption generates heat that causes localized melting, thermal stress fractures, or, if sufficient heat is generated, a small explosion that ablates the coating.

Laser induced damage threshold (LIDT) is of great importance for both high-energy pulse compression gratings and high-average power applications such as Spectral Beam Combining (SBC). A critical optical component used in both technologies is the multi-layer dielectric (MLD) grating utilizing advanced and novel optical thin film stacks. In various cases, this optical element is required to handle the full power load, with minimal thermal distortion over a limited spot size. The power densities and thermal loads on this optical element can thus be the limiting factor in power scaling of the technology. Current grating designs have significant limitations in overall power handling. It is desirable to provide substantial advances in several topical areas to improve the laser damage threshold and/or to provide reduced absorption and/or increased diffraction efficiency.

SUMMARY

The present disclosure provides substantial advances in several topical areas to improve the performance of optical structures, e.g., multi-layer dielectric gratings (MDGs), such as improved laser damage threshold, reduced absorption and increased diffraction efficiency or any combination of these. It enables significant scaling in output energy and average power for next generation ultrafast and spectrally-combined laser systems.

Embodiments of the present disclosure provide new optical thin film designs and optical elements protected by windows having significantly improved laser damage thresholds, and/or ultra-low-loss. These advances may be achieved by utilizing materials with electronic band gaps and refractive indices that are higher than those that are conventionally used. Additional embodiments provide multilayer dielectric optical film stacks with significantly improved laser damage thresholds and/or ultra-low-loss.

Embodiments of the present disclosure include a multi-layer dielectric grating where a grating structure is affixed onto the top layer of a dielectric stack. The multilayer structure is designed for use with the grating layer since the grating layer will comprise one of the layers of the multi-layer stack. The multilayer stack is affixed to a substrate. Any number of the layers of multilayer stack may have an electronic band gap that is at least 6.0 eV and an index of refraction that is at least 1.8. Additionally, or alternately, the grating layer may have an electronic band gap that is at least 6.0 eV and an index of refraction that is at least 1.8. At least one layer of the layers of the stack, and/or the grating, comprise a dielectric material, where each layer of the plurality of layers comprises either a high refractive index dielectric material or a low refractive index dielectric material, where the high refractive index dielectric material and the low refractive index dielectric material comprise a difference in refractive index greater than 0.1, where the plurality of layers comprises a top layer and a bottom layer, where the bottom layer is affixed to the substrate. The dielectric material for some embodiments can consist of or comprise diamond, aluminum nitride, boron nitride, magnesium oxide, yttrium oxide and/or scandium oxide. As an alternate to the grating, the embodiment can be configured as a quarter-wave stack, a highly reflecting laser mirror, a partially transmissive output coupler, a dichroic mirror, an optical filter, a beam splitter, a heat reflector, a solar cell cover, a thin-film polarizer, a Bragg mirror and a Rugate filter. At least one layer of the plurality of layers can comprise an anti-reflection coating. Material transparent to a wavelength of interest is generally utilized to form the dielectric stack. The dielectric stack can be formed of alternating layers of oxide material. The substrate can comprise transparent or opaque material, can be of reflective material and can be flat, curved or a combination thereof. The substrate surface is appropriately prepared prior to affixing the plurality of layers to the substrate. Further, the dielectric stack may comprise alternating layers of material transparent to a wavelength of interest, where different layers (e.g., each layer) comprise one or more oxide material, fluoride material, sulfide material, selenide material and nitride material. The alternating layers of oxide materials can be designed to serve as a coating of any reflectance for a wavelength of interest. Dielectric material can be utilized as the substrate and such material can include one or more of glass, silica and sapphire. Further, the substrate can be formed of organic material, polymeric material, plastics, nylon, resin and semiconductor material such as silicon and gallium arsenide. The disclosure further contemplates a method of fabricating the described embodiments.

In various implementations, an optical device can include an optical structure and a bulk window disposed over the optical structure. The optical structure can comprise a grating, an interference coating, a multilayer thin film stack, a reflector, or a meta surface structure. The bulk window can comprise a material having a band gap that is at least 5.0 eV and a thickness. The bulk window can be configured to increase the laser induced damage threshold of the underlying optical structure.

In various implementations, a method of fabricating an optical device can include providing an optical structure and disposing a bulk window over the optical structure. The optical structure can comprise a grating, an interference coating, a multilayer thin film stack, a reflector, or a meta surface structure. The bulk window can comprise a material having a band gap that is at least 5.0 eV and a thickness. The bulk window can be configured to increase the laser induced damage threshold of the underlying optical structure.

BRIEF DESCRIPTION OF THE DRAWINGS

The accompanying drawings, which are incorporated into and form a part of the disclosure, illustrate embodiments of the disclosure and, together with the description, serve to explain the principles of the disclosure.

DETAILED DESCRIPTION

The Diffractive Optics Group of the National Ignition Facility (NIF) Directorate at Lawrence Livermore National Laboratory (LLNL) is a preeminent supplier of large-aperture, high damage-threshold diffraction gratings and other diffractive optics to laser institutions around the world. The LLNL group can, for instance, produce polarization insensitive Spectral Beam Combining (SBC) gratings. Gratings, for example, designed for polarization independent operation at nominally 1 μm and with a Littrow out-of-plane (conical) mounting, have been shown to have >98% diffraction efficiency over >40 nm bandwidth.

Various current (prior art) grating designs, have significant laser damage threshold limitations and overall power handling limitations due to the high-index, low bandgap, material utilized in the "grating pillars" such as $Ta_2O_5$ and $HfO_2$. Laser damage thresholds are highly dependent on the effective bandgap of the dielectric material. The reason for the bandgap dependence appears to be extreme localized heating from the highly absorbing particulates. Such localized heating cause thermal free carriers to be generated, which sets off a runaway process of free carrier absorption and generation.

Embodiments of the present disclosure include new grating designs where one or more of the individual layers of the grating are made of the higher bandgap material. These gratings can provide significantly improved laser damage thresholds, ultra-low-loss, and high diffraction efficiency or any combination of these, and can be achieved by utilizing materials that have an electronic band gap of at least 6.0 eV (e.g., diamond, aluminum nitride, boron nitride) and an index of refraction that is greater than 1.8.

The disclosure is further applicable to other multilayer dielectric optical film stacks to potentially improve their laser damage threshold (LDT). Dielectric coatings, thin-film coatings or interference coatings, may comprise or consist of thin (typically sub-micron) layers of transparent dielectric materials, which are deposited on a substrate. Their function may essentially be to modify the reflective (and/or transmissive) properties of the surface by exploiting the interference of reflections from multiple optical interfaces (as well as possibly interference of light transmitted therethrough). Their uses include for highly reflecting laser mirrors or partially transmissive output couplers, for dichroic mirrors (treating different wavelengths differently), for anti-reflection coatings and for various kinds of optical filters (e.g., for attenuation of certain wavelength regions), beam splitters, heat reflectors, solar cell covers and thin-film polarizers, but is not limited to these. While simple single-layer coatings are often used as anti-reflection coatings, dielectric mirrors normally use a number, e.g., dozens of thin-film layers, sometimes even more than 100. Various embodiments of the present disclosure comprise one or more of the individual layers made of the higher bandgap material. A typical mirror design is the simple Bragg mirror, but there are many more sophisticated mirror designs. The typical kind of dielectric coating comprises or consists of discrete layers with substantially different refractive indices. However, other designs are possible. For example, there are also gradient-index coatings for Rugate filters, where the refractive index is varied continuously. That can be achieved, for example, by gradually varying the chemical composition of the material during growth.

In many cases, the coating substrate is some kind of glass, with a wide transparency range and high optical quality (low bubble content), a very smooth surface (after proper polishing), and high durability or any combination of these. However, dielectric coatings can also be applied to crystalline materials and even on metal substrates, e.g., as anti-reflection coatings on nonlinear crystals for nonlinear frequency conversion and Pockels cells, or on semiconductor devices such as edge-emitting laser diodes, vertical cavity surface-emitting lasers and photodiodes. A further area of increasing importance is the fabrication of dielectric coatings on polymers (plastic materials), as plastic optics are increasingly used due to their competitive properties, e.g., in terms of price and the ease of fabricating non-spherical surfaces (e.g., for aspheric lenses).

The material properties of the dielectric films can substantially depend on the used fabrication method and fabrication parameters such as the substrate temperature or partial pressures of various substances. Compared with the ordinary bulk materials of nominally the same chemical composition, thin-film layers often have a reduced packing density and a reduced refractive index. When designing a dielectric coating for fabrication on a certain coating machine, one should have the refractive index data for that machine under the used conditions, as the differences can be substantial.

Figure 1:
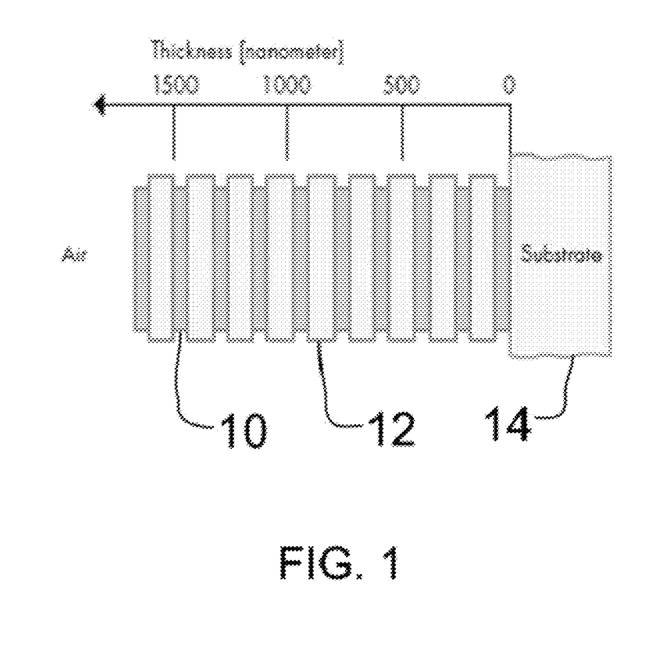
FIG. 1 is a schematic drawing of a quarter-wave stack comprising layers with equal optical thickness of a high index material and a low index material.
Figure 2:
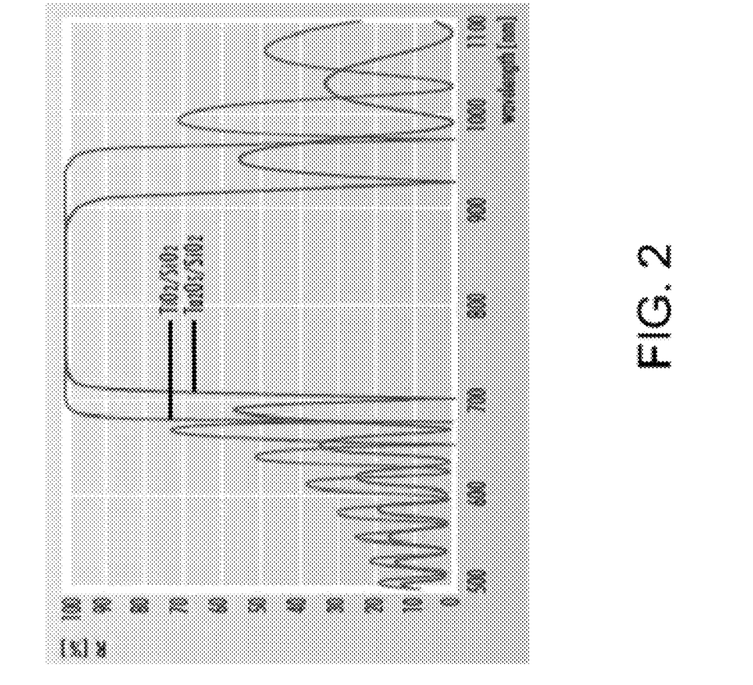
FIG. 2 shows reflectivity spectra of two quarter-wave stacks comprising 15 pairs of $Ta_2O_5/SiO_2$ and $TiO_2/SiO_2$.
Figure 3:
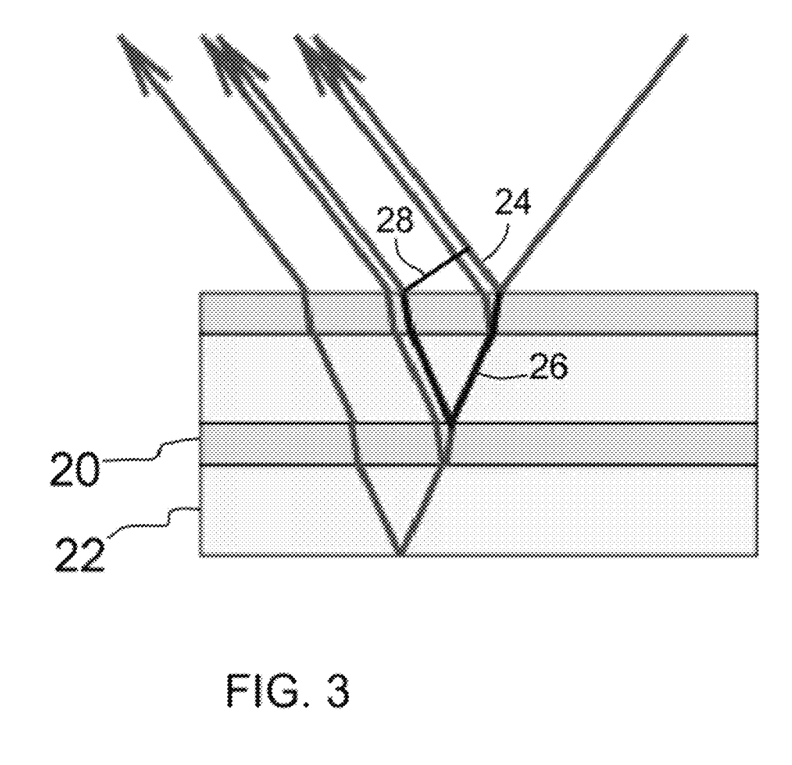
FIG. 3 is a diagram of a dielectric mirror where thin layers with a high index material $n_1$ are interleaved with thicker layers of a lower refractive index $n_2$.

For optical mirrors and partial reflectors, the most common mirror design is the so-called quarter wave stack, e.g., a stack of alternating high and low index layers with an equal optical thickness of $nt=\lambda/4$ for the desired wavelength, where t is the physical thickness of the layer. See FIG. 1, which is a schematic drawing of a quarter-wave stack consisting of alternating layers with equal optical thickness of a high index material 10 and a low index material 12, respectively. In this embodiment, a high index layer is in direct contact with substrate 14. The alternating indexes result in constructive interference of the reflected beams arising at each interface between the layers. The spectral width of the reflection band and the achievable reflectivity for a given number of layer pairs depends on the ratio of the refractive indices of the layer materials. A large refractive index ratio results in a broad reflection band while a narrow reflection band can be produced using materials with a low refractive index ratio. FIG. 2 shows reflectivity spectra of two quarter-wave stacks consisting of 15 pairs of $Ta_2O_5/SiO_2$ and $TiO_2/SiO_2$. FIG. 3 is a diagram of a dielectric mirror. Thin layers 20 with a high index material are interleaved with thicker layers 22 of a lower refractive index. The path lengths 24 and 26 to respective points intersecting line 28 differ by exactly one wavelength, which leads to constructive interference. The laser damage threshold of these devices, and all of the devices mentioned in this disclosure, is improved when one or more layers are formed of the higher bandgap material of the present disclosure. Techniques for fabricating multilayer dielectric gratings are well known in the art. See, e.g., U.S. Pat. No. 5,907,436. Those skilled in the art, based on the present disclosure, will understand that the present disclosure has wide application, including to other optical materials.

Figure 4:
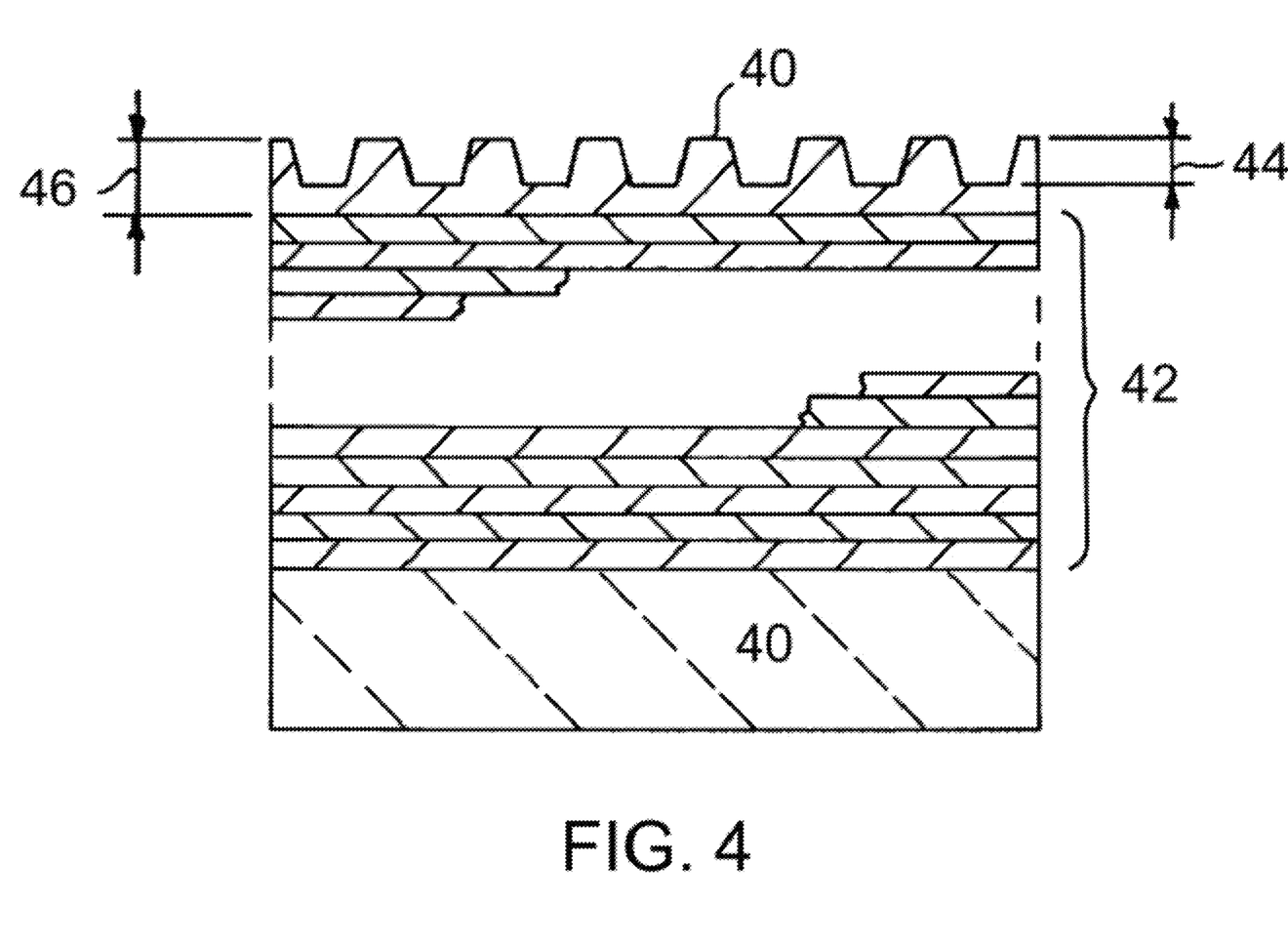
FIG. 4 show a schematic of an exemplary multilayer dielectric grating according to the principles of the present disclosure.

FIG. 4 shows an embodiment of a multilayer dielectric grating according to the present disclosure. Grating 40 is affixed onto the top layer of the dielectric stack 42. The multilayer structure 42 must be designed for use with the grating layer 40 under consideration since the grating layer 40 will comprise one of the layers of the multilayer stack 42. The multilayer stack 42 is affixed to a substrate 44. The figure shows groove height 44 and top layer thickness 46. Any number of the layers of multilayer stack 42 may have an electronic band gap that is at least 6.0 eV and an index of refraction that is at least 1.8. Additionally, or alternately, grating layer 40 may have an electronic band gap that is at least 6.0 eV and an index of refraction that is at least 1.8.

Referring still to FIG. 4, in some implementations, at least one layer of the layers of the stack 42, and/or the grating 40 comprise a dielectric material, where each layer of the plurality of layers comprises either a high refractive index dielectric material or a low refractive index dielectric material, where the high refractive index dielectric material and the low refractive index dielectric material comprise a difference in refractive index greater than 0.1, where the plurality of layers comprises a top layer and a bottom layer, where the bottom layer is affixed to the substrate. The dielectric material for some embodiments can comprise or consist of diamond, aluminum nitride, boron nitride, magnesium oxide, yttrium oxide and/or scandium oxide. As an alternate to the grating, the embodiment can be configured as a quarter-wave stack, a highly reflecting laser mirror, a partially transmissive output coupler, a dichroic mirror, an optical filter, a beam splitter, a heat reflector, a solar cell cover, a thin-film polarizer, a Bragg mirror and a Rugate filter. In some implementations, at least one layer of the plurality of layers can comprise an anti-reflection coating. Material transparent to a wavelength of interest is generally utilized to form the dielectric stack. The dielectric stack can be formed of alternating layers of oxide material in some cases. The substrate can comprise transparent or opaque material, can be of reflective material and can be flat, curved or a combination thereof. The substrate surface may be appropriately prepared prior to affixing the plurality of layers to the substrate. Further, the dielectric stack may comprise alternating layers of material transparent to a wavelength of interest, where different (e.g., each) layer comprises one or more oxide material, fluoride material, sulfide material, selenide material and nitride material or any combination thereof. In various implementations, the alternating layers of oxide materials can be designed to serve as a coating of any reflectance for a wavelength of interest. In various designs, dielectric material can be utilized as the substrate and such material can include one or more of glass, silica and sapphire. Further, the substrate can be formed of organic material, polymeric material, plastics, nylon, resin and semiconductor material such as silicon and gallium arsenide. The disclosure further contemplates methods of fabricating the exemplary embodiment of FIG. 4.

Some embodiments of the disclosure optically bond a high bandgap bulk material layer (e.g., a bulk window comprising a high bandgap material), such as fused silica, diamond, aluminum oxide (e.g., sapphire or porous aluminum oxide), etc. to the external or outermost layer of the multilayer dielectric grating stack of the present disclosure. As described herein, the grating layer can comprise one of the layers of the multilayer stack. For high power CW laser applications, a predominant mechanism for laser damage is extreme localized heating from highly absorbing particulates (damage initiators) that cause thermal free carriers to be generated, which sets off a runaway process of free carrier absorption and generation. In many instances, the damage initiators are not intrinsic to the coating deposition process, but a product of the environment that the optics are in such as with dirt, metal particulates from screws and optical mounts, outgassing oils and fluoropolymers, etc. Experiments have shown that a pristine grating, e.g., one without any contamination on the surface, can have a more than ten times higher laser damage threshold. Without being bound by theory, this may be due to the fact that the grating structure can significantly increase the surface tension of the optic compared to a planar surface such as a lens or mirror. The increase surface tension can make it challenging to remove the surface contamination.

Figure 5A:
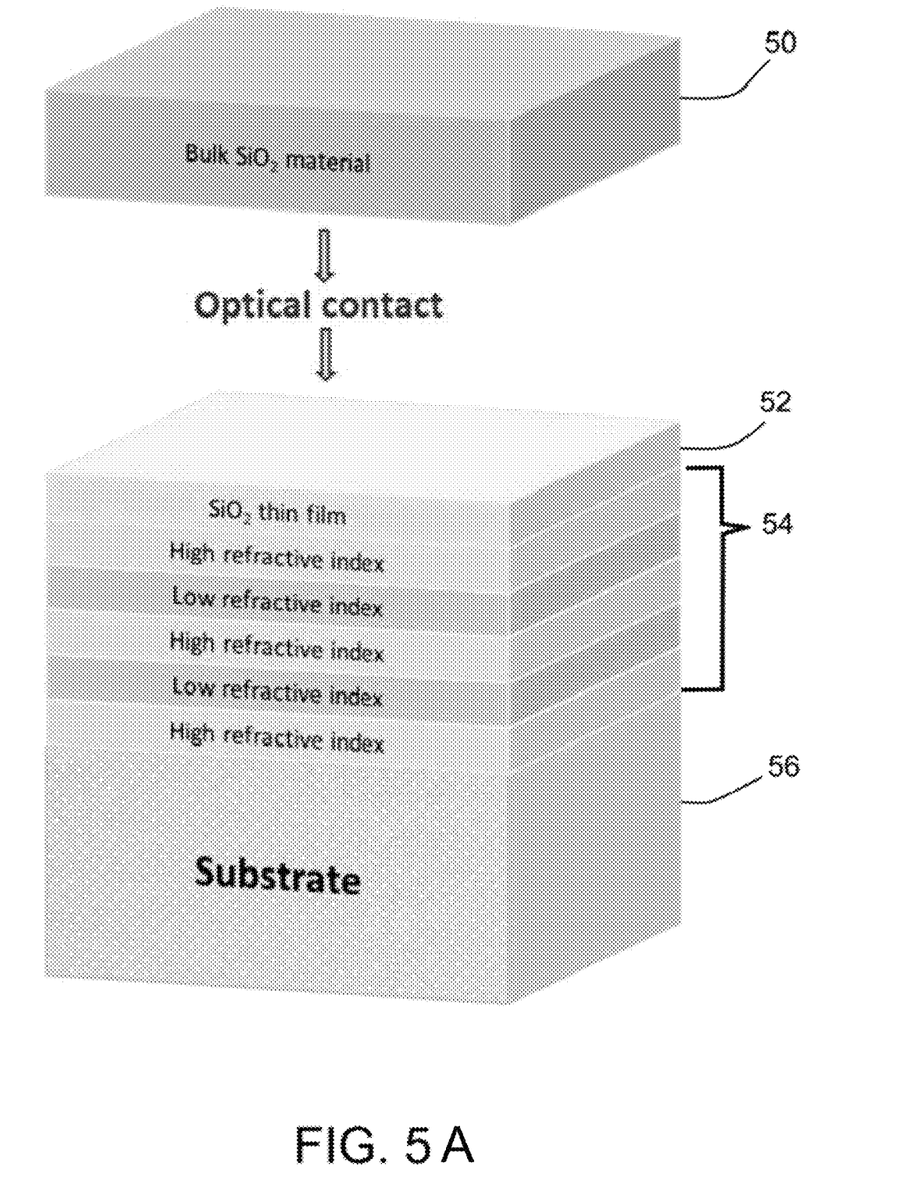
FIG. 5A shows an embodiment where a high bandgap bulk material layer is optically bonded to the external or outermost layer of the multilayer dielectric grating stack of the present disclosure.

Referring to FIG. 5A, a thick layer of high bandgap material 50 (e.g., a bulk window) such as fused silica, diamond, aluminum oxide (e.g., sapphire or porous aluminum oxide), etc. used as an outer layer would greatly reduce this type of laser damage but such layer cannot generally be deposited in a thick enough layer to make a difference. Problems such as delamination or highly compressive stress of underlying layers may result if fused silica is deposited to an effective thickness. An approach described herein is to instead provide a bulk layer of the desired thickness and then bond it (e.g., optically bond it) to the outer layer. In some implementations, for obtaining the highest laser damage threshold performance, the bond (e.g., optical bond) can be chemical free—no adhesive or epoxy, such as optical contacting or diffusion bonding. In the figure, a thick layer 50 of bulk $SiO_2$ is bonded (e.g., optical bonded) to a thin $SiO_2$ layer 52, which is deposited onto alternating layers of high and low refractive index material 54, which is deposited onto substrate 56. Based on this disclosure, those skilled in the art will understand that there are other techniques to adhere the bulk $SiO_2$ layer to the multilayer stack and that the materials, sizes, configurations may be different. $SiO_2$ is but one example of a high bandgap material useable in this embodiment. Based on this disclosure, other high bandgap materials are useable as well. The device can comprise a relatively thick layer of high bandgap material adherent to the outer layer of the plurality of layers, where the high bandgap material has a band gap that is at least 5.0 eV (e.g., 5.0 eV, 6.0 eV, 7.0 eV, 8.0 eV, 9.0 eV, 10.0 eV, etc. or any ranges formed by any of such values). For example, in some designs, the high bandgap material can have a band gap that is from 5.0 eV to 10.0 eV, or from 5.0 eV to 9.0 eV or from 5.0 to 8.0 eV or from 6.0 eV to 10.0 eV, etc. Further, the high bandgap material can comprise an index of refraction that is at least 1.02 (e.g., 1.03, 1.04, 1.05, 1.1, 1.2, 1.3, 1.4, 1.5, 1.7, 1.8, 1.9, 2.0, 2.1, 2.2, 2.5, 3.0, 3.5, 4.0, 4.5, etc., or any ranges formed by any of such values), and the relatively thick layer can have a thickness of at least 50 microns or >50 microns (e.g., 55 microns, 60 microns, 70 microns, 80 microns, 90 microns, 100 microns, 250 microns, 300 microns, 400 microns, 500 microns, 1,000 microns, 2,000 microns, 3,000 microns, 4,000 microns, 5,000 microns, 10,000 microns, 20,000 microns, 30,000 microns, 40,000 microns, 50,000 microns, 60,000 microns, 70,000 microns, 80,000 microns, 100,000 microns, 200,000 microns, 300,000 microns, 400,000 microns, 500,000 microns etc., or any ranges formed by any of such values). For example, in some instances, the high bandgap material can have an index of refraction that is from 1.02 to 4.5, or from 1.5 to 4.5, from 1.6 to 4.5, from 1.7 to 4.5, from 1.8 to 4.5, from 1.6 to 2.2, etc. As another example, in some instances, the high bandgap material can have a thickness from 50 microns to 50,000 microns, from 50 microns to 100,000 microns, etc. Values outside these ranges are also possible.

A method of the disclosure can further comprise adhering a relatively thick layer of high bandgap material to the outer layer of the plurality of layers, where the high bandgap material has a band gap that is at least 5.0 eV. The high bandgap material can comprise an index of refraction that is at least 1.02, and the relatively thick layer can have a thickness of at least 50 microns or >50 microns. The high bandgap bulk material layer 50 can form a bulk window that can (1) help protect the underlying grating structure or multilayer film 54 from environmental contaminants (e.g., reducing localized heating) and (2) provide a high bandgap outer surface that is exposed to the highest laser power. In various implementations, the bulk material layer 50 can include an anti-reflection coating or a bulk meta surface, e.g., to reduce or minimize Fresnel reflection and interference effects.

With continued reference to FIG. 5A, the relatively thick or bulk layer 50 of high bandgap material is described as disposed over a multilayer dielectric grating stack 54. The grating layer (e.g., having a groove height 44 and a top layer thickness 46 shown in FIG. 4) can be affixed to, formed in, or comprise any of the layers in the multilayer stack 54, between the substrate 56 and the multilayer stack 54, or on the multilayer stack 54. In the implementation shown in FIG. 5A, since the bulk material layer 50 comprises a high bandgap material, the multilayer stack 54 may or may not include a layer having an electronic band gap that is at least 6.0 eV and/or an index of refraction that is at least 1.8 as described with respect to various examples.

In some instances, the multilayer stack 54 may include a grating layer (e.g., as shown in FIG. 4). The bulk material layer 50 can be bonded to the multilayer stack 54 as described herein (e.g., optical contacting, diffusion bonding, etc.). As an example, a thin layer 52 (e.g., $SiO_2$ layer) may be provided and a bulk material layer 50 may be optically contacted to the thin layer 52. In some instances, the thin layer 52 may be a planarization layer of the multilayer stack 54. For example, a planarization layer may be provided between the grooves of the grating layer, and the bulk material layer 50 may be bonded to the planarization layer (e.g., a bulk $SiO_2$ layer optically contacted to a $SiO_2$ planarization layer).

Although FIG. 5A describes a thick layer 50 of high bandgap material disposed over a multilayer dielectric grating stack 54, other optical structures can be used, For example, the thick layer 50 of high bandgap material can be disposed over any optical structure. In some instances, the optical structure comprises a grating, an interference coating, a multilayer stack, a multilayer dielectric stack, or any combination thereof. In some instances, the optical structure comprises a reflector. The reflector can include a reflective coating such as a metallic coating. In some instances, the optical structure can comprise a meta surface structure such as a two-dimensional meta surface structure. The meta surface structure can include e.g., a retarder. Also, although the thick layer 50 is described as bonding to the stack 54 via optically contacting (e.g., via the thin layer 52 or wherein the top layer of the stack comprises the same material as the thick layer), the thick layer 50 can be bonded to the stack 54 using any appropriate method known in the art or yet to be developed including, e.g., diffusion bonding.

Figure 5B:
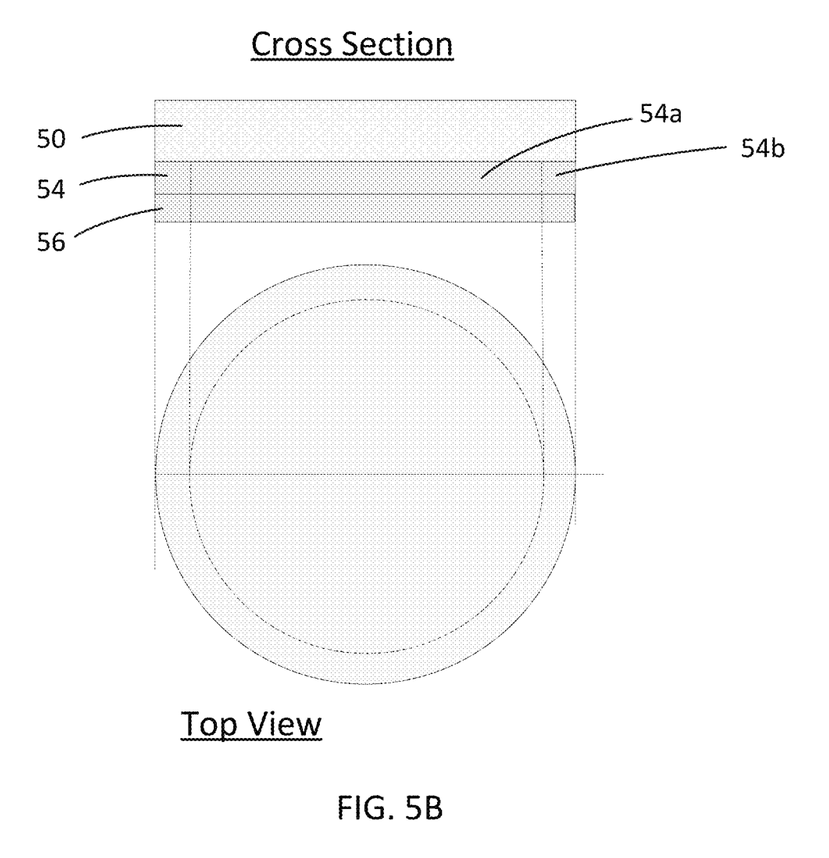
FIG. 5B shows an implementation of a high bandgap bulk material layer disposed over an optical structure.

As an example, FIG. 5B shows the relatively thick or bulk layer 50 of high bandgap material (e.g., a bulk window) disposed over an optical structure 54, e.g., disposed on a substrate 56. As described herein, the bulk material layer 50 can comprise a material having a band gap and the thickness. In various instances, the bulk material layer 50 can be rigid. In various implementations, the bulk material layer 50 can be configured to increase the laser induced damage threshold of the underlying optical structure. In some implementations, the bulk material layer 50 can be bonded to the optical structure 54 chemical free, e.g., as described herein using optical contacting or diffusion bonding. In some implementations, a mechanical bond (e.g., using an adhesive or an epoxy) may be used. For example, as shown in FIG. 5B, the optical structure 54 can have a top surface having a central portion 54a and an outer portion 54b disposed around the central portion 54a. The bulk material layer 50 can be bonded to the outer portion 54b of the top surface of the optical structure 54. In some instances, the bulk material layer may not be bonded to the central portion such that an adhesive or an epoxy can be used (e.g., since the adhesive or epoxy would not be provided in the optical path).

As described herein, the bulk material layer 50 of high bandgap material can be disposed over any optical structure 54 (e.g., a grating, an interference coating, a multilayer stack such as a multilayer dielectric stack, a reflector, a metasurface structure, etc.). For optical structures with topography or surface relief (e.g., a grating or a two-dimensional meta surface structure), it may be desirable for the bulk material layer 50 to not contact the topography of the optical structure 54. In some instances, the optical structure 54 may include a planarization layer (e.g., within the recesses of the grating or other optical structure with surface relief), and the bulk layer material 50 may be bonded to the planarization layer.

Figure 6:
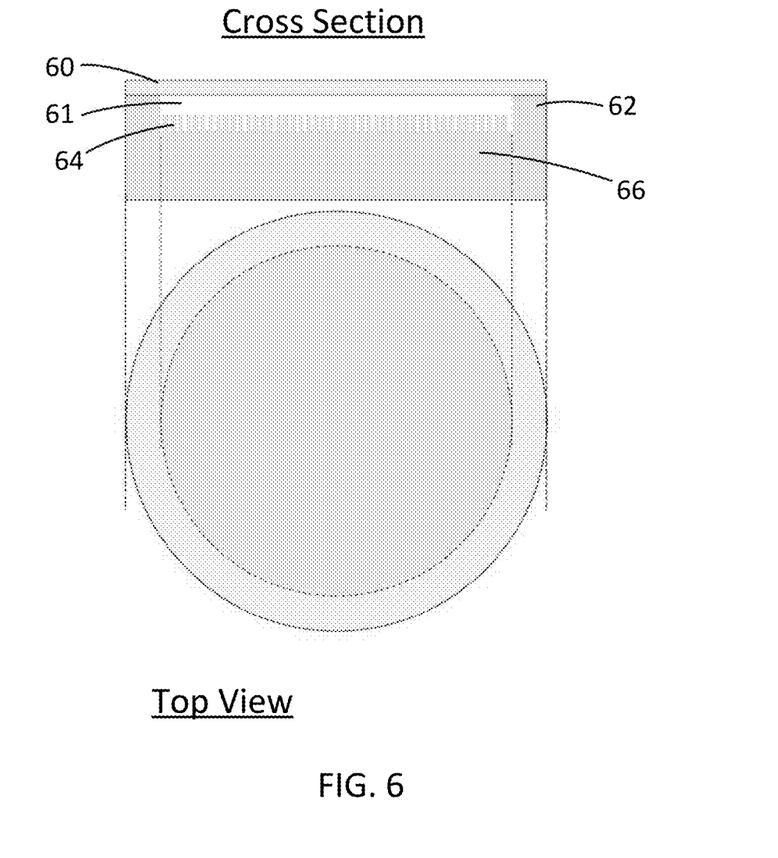
FIG. 6 shows an implementation where a high bandgap bulk material layer is disposed over an optical structure with a gap therebetween.

To reduce possible damage to the optical structure, FIG. 6 illustrates an example implementation with the bulk material layer 60 disposed over the optical structure 64 with a gap 61 comprising open space, e.g., an air gap therebetween. Some such implementations can advantageously reduce possible damage due to physical contact between the bulk material layer 60 and the optical structure 64. In the example implementation, the optical structure 64 is a grating and the gap 61, e.g., air gap, can reduce possible damage to the diffractive or grating features, e.g., damage to the groove heights. In various designs, the bulk material layer 60 can be a 1 centimeter or less (e.g., 0.9 cm, 0.8 cm, 0.7 cm, 0.6 cm, 0.5 cm, 0.4 cm, 0.3 cm, 0.2 cm, 0.1 cm, 0.05 cm, etc. or any ranges formed by any of such values) from the optical structure 64. For example, in some implementations, the bulk material layer 60 may be from 0.9 to 0.05 cm, or from 0.9 cm to 0.1 cm or from 0.9 cm to 0.2 cm, from the optical structure 64. In some implementations, the gap may be larger or smaller.

In various instances, the optical structure 64 can be disposed within a recessed region formed by an underlying surface 66 and one or more sidewalls 62. In various implementations, the optical structure 64 can be affixed or fabricated on the underlying surface 66. The bulk material layer 60 can be disposed over the recessed region to enclose or encapsulate the optical structure 64 therein. In some instances, the recessed region can be formed by a substrate and a raised edge of the substrate. For example, in some implementations, the optical structure 64 can be affixed or fabricated on an optical substrate 66 where the region where the optic is exposed to the laser beam is in the recessed region. In some such designs, this leaves a rim 62 around the outer edge that is taller than the center. The outer rim 62 can allow a bulk material layer 60 (e.g., a bulk window) to be attached via optically contacting, diffusion bonding, mechanical bonding (e.g., adhesive or epoxy), etc. reducing possible physical contact of the bulk material layer 60 with the delicate optical structure 64. Because the bulk material layer 60 can be bonded to one or more sidewalls 62 and away from the optical path, the bonding technique is not limited.

In FIG. 6, the underlying surface 66 and the one or more sidewalls 62 have a circular cross-sectional shape as shown in the top view. However, the cross-sectional shape is not limited. For example, the cross-sectional shape can be oval, square, rectangular, irregularly shaped or have other shapes. Although in FIG. 6, the sidewall 62 is formed in the substrate 66, in some instances, the one or more sidewalls 62 may be formed separate from the underlying surface 66, and coupled to the underlying surface 66. For example, in some instances, the one or more sidewalls 62 may be formed by an o-ring. Various examples are possible.

Figure 7:
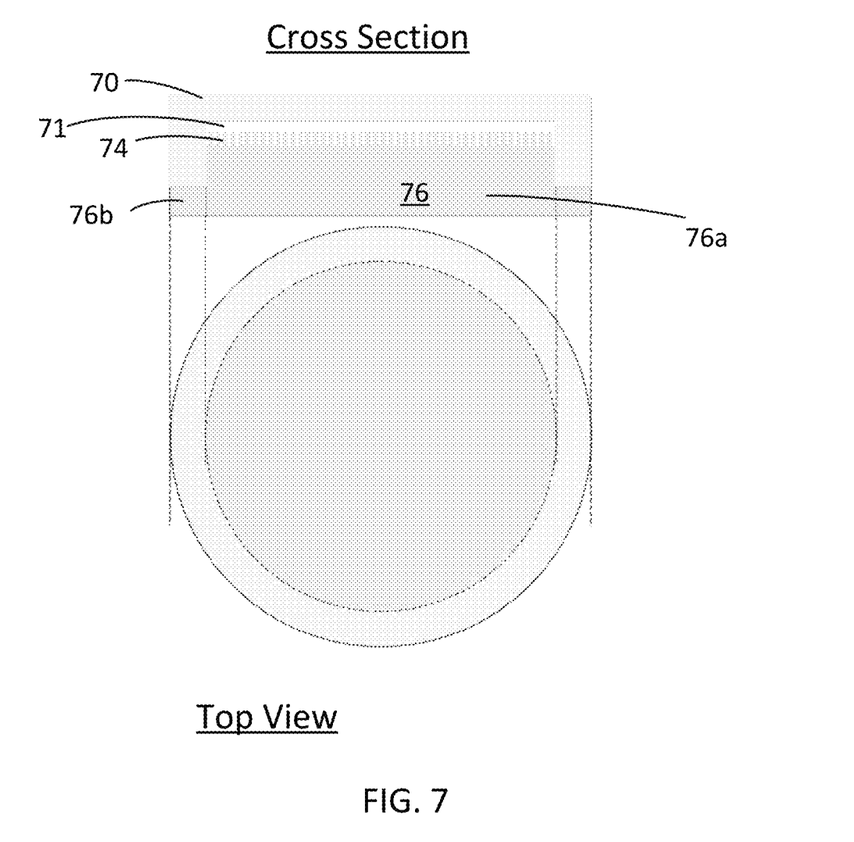
FIG. 7 shows another implementation where a high bandgap bulk material layer is disposed over an optical structure with a gap therebetween.

FIG. 7 illustrates another example implementation with the bulk material layer 70 disposed over the optical structure 74 with a gap 71 (e.g., an air gap) therebetween. In various instances, the optical structure 74 can be disposed within a recessed region formed by the bulk material layer 70 and the bulk material layer 70 can be disposed over the optical structure 74 to enclose the optical structure 74 therein. In various implementations, the substrate 76 can have a central portion 76a and an outer portion 76b disposed around the central portion 76a. The optical structure 74 can be disposed on the central portion 76a of the substrate 76 and the bulk material layer 70 can be bonded to the outer portion 76b of the substrate 76.

As shown in FIG. 6 and FIG. 7, because various implementations can include a gap 61, 71, such as an air gap, between the bulk material layer 60, 70 and the optical structure 64, 74, the shape of the optical structure 64, 74 is not limited. For example, the optical structure 64, 74 can have topography or surface relief. In some implementations, the bulk material layer 60, 70 and/or the substrate 66, 76 can be shaped and bonded together such that the bulk material layer 60, 70 does not contact the optical structure 64, 74. For example, the bulk material layer 60, 70 and/or the substrate 66, 76 may have curved or U-shaped surfaces (e.g., to form a gap such as an air gap between the bulk material layer and the optical structure).

For planar (e.g., one or more planar thin film surfaces) and/or smooth structures (e.g., structures with smooth curvature), some implementations may or may not include the recessed region as shown in FIG. 6 or FIG. 7. In some such implementations, as shown in FIG. 5A and FIG. 5B, the bulk material layer 50 may contact the optical structure 54 (e.g., directly contact the optical structure 54 in some instances).

As described herein, the optical structure can comprise any of the structures described herein, e.g., a grating, an interference coating, a multilayer stack, a multilayer dielectric stack, a reflector, a meta surface structure, or any combination thereof as well as any other optical structure or structures. The optical structure may or may not include high band gap material, e.g., material having a band gap of at least 5.0 eV such as one or more layer of material having a band gap of at least 5.0 eV. Various methods are provided to enclose or encapsulate such optical structures to improve laser damage performance and to help protect from environmental contamination.

Concepts:

This writing also presents at least the following concepts:
1. An apparatus, comprising:
 a substrate; and
 a plurality of layers on said substrate, wherein at least one layer of said layers comprises material with an electronic band gap that is at least 6.0 eV and an index of refraction that is at least 1.8.

2. The apparatus of concepts 1 and 3-25, wherein at least one layer of said layers comprises a dielectric material, wherein each layer of said plurality of layers comprises either a high refractive index dielectric material or a low refractive index dielectric material, wherein said high refractive index dielectric material and said low refractive index dielectric material comprise a difference in refractive index greater than 0.1, wherein said plurality of layers comprises a top layer and a bottom layer, wherein said bottom layer is affixed to said substrate.

3. The apparatus of concepts 1, 2 and 4-25, wherein said material is selected from the group consisting of diamond, aluminum nitride, boron nitride, magnesium oxide, yttrium oxide and scandium oxide.

4. The apparatus of concepts 1-3 and 5-25, wherein said apparatus comprises a multi-layer dielectric (MLD) grating.

5. The apparatus of concepts 1-4 and 6-25, wherein said apparatus comprises a multilayer dielectric stack.

6. The apparatus of concepts 1-5 and 7-25, wherein said apparatus comprises a quarter-wave stack.

7. The apparatus of concepts 1-6 and 8-25, wherein said apparatus is selected from the group comprising a highly reflecting laser mirror, a partially transmissive output coupler, a dichroic mirror, an optical filter, a beam splitter, a heat reflector, a solar cell cover, a thin-film polarizer, a Bragg mirror and a Rugate filter.

8. The apparatus of concepts 1-7 and 9-25, wherein at least one layer of said plurality of layers comprises an anti-reflection coating.

9. The apparatus of concept 5, wherein said dielectric stack comprises dielectric material transparent to a wavelength of interest.

10. The apparatus of concept 5, wherein said dielectric stack comprises alternating layers of oxide material.

11. The apparatus of concepts 1-10 and 12-25, wherein said substrate comprises transparent material.

12. The apparatus of concepts 1-11 and 13-25, wherein said substrate comprises opaque material.

13. The apparatus of concepts 1-12 and 14-25, wherein said substrate comprises reflective material.

14. The apparatus of concepts 1-13 and 15-25, wherein said substrate is at flat.

15. The apparatus of concepts 1-14 and 16-25, wherein said substrate comprises a curved surface.

16. The apparatus of concept 15, wherein said curved surface has been prepared prior to affixing said plurality of layers to said substrate.

17. The apparatus of concept 5, wherein said dielectric stack comprises alternating layers of material transparent to a wavelength of interest, wherein said each layer comprises a material selected from the group consisting of oxide material, fluoride material, sulfide material, selenide material and nitride material.

18. The apparatus of concept 5, wherein said dielectric stack comprises alternating layers of oxide materials that are designed to serve as a coating of any reflectance for a wavelength of interest.

19. The apparatus of concepts 1-18 and 20-25, wherein said substrate comprises dielectric material.

20. The apparatus of concepts 1-19 and 21-25, wherein said substrate comprises dielectric material selected from the group consisting of glass, silica and sapphire.

21. The apparatus of concepts 1-20 and 22-25, wherein said substrate comprises organic material.

22. The apparatus of concepts 1-21 and 23-25, wherein said substrate comprises polymeric material.

23. The apparatus of concepts 1-22, 24 and 25, wherein said substrate comprises material selected from the group consisting of plastics, nylon and resin.

24. The apparatus of concepts 1-23 and 25, wherein said substrate comprises semiconductor material.

25. The apparatus of concepts 1-24, wherein said substrate comprises semiconductor material selected from the group consisting of silicon and gallium arsenide.

26. A method for fabricating an apparatus, the method comprising:
    providing a substrate;
    forming a plurality of layers on said substrate, wherein at least one layer of said layers comprises material with an electronic band gap that is at least 6.0 eV and an index of refraction that is at least 1.8.

27. The method of concepts 26 and 28-50, wherein said each layer comprises a dielectric material, wherein said each layer comprises either a high refractive index dielectric material or a low refractive index dielectric material, wherein said high refractive index dielectric material and said low refractive index dielectric material comprise a difference in refractive index greater than 0.1, wherein said plurality of layers comprises a top layer and a bottom layer, wherein said bottom layer is affixed to said substrate.

28. The method of concepts 26, 27 and 29-50, wherein said material is selected from the group consisting of diamond, aluminum nitride, boron nitride, magnesium oxide yttrium oxide and scandium oxide.

29. The method of concepts 26-28 and 30-50, wherein said apparatus comprises a multi-layer dielectric (MLD) grating.

30. The method of concepts 26-29 and 31-50, wherein said apparatus comprises a multilayer dielectric stack.

31. The method of concepts 26-30 and 32-50, wherein said apparatus comprises a quarter-wave stack.

32. The method of concepts 26-31 and 33-50, wherein said apparatus is selected from the group comprising a highly reflecting laser mirror, a partially transmissive output coupler, a dichroic mirror (treating different wavelengths differently), an optical filter (e.g., for attenuation of certain wavelength regions), a beam splitter, a heat reflector, a solar cell cover, a thin-film polarizer, a Bragg mirror and a Rugate filter.

33. The method of concepts 26-32 and 34-50, wherein said layer comprises an anti-reflection coating.

34. The method of concept 30, wherein said dielectric stack comprises dielectric material transparent to a wavelength of interest.

35. The method of concept 30, wherein said dielectric stack comprises alternating layers of oxide material.

36. The method of concepts 26-35 and 37-50, wherein said substrate comprises transparent material.

37. The method of concepts 26-36 and 38-50, wherein said substrate comprises opaque material.

38. The method of concepts 26-37 and 39-50, wherein said substrate comprises reflective material.

39. The method of concepts 26-38 and 40-50, wherein said substrate is at flat.

40. The method of concepts 26-39 and 41-50, wherein said substrate comprises a curved surface.

41. The method of concept 40, wherein said curved surface has been prepared prior to affixing said plurality of layers to said substrate.

42. The method of concept 30, wherein said dielectric stack comprises alternating layers of material transparent to a wavelength of interest, wherein said each layer comprises a material selected from the group consisting of oxide material, fluoride material, sulfide material, selenide material and nitride material.

43. The method of concept 30, wherein said dielectric stack comprises alternating layers of oxide materials that are designed to serve as a coating of any reflectance for a wavelength of interest.

44. The method of concepts 26-43 and 45-50, wherein said substrate comprises dielectric material.

45. The method of concepts 26-44 and 46-50, wherein said substrate comprises dielectric material selected from the group consisting of glass, silica and sapphire.

46. The method of concepts 26-45 and 47-50, wherein said substrate comprises organic material.

47. The method of concepts 26-46 and 48-50, wherein said substrate comprises polymeric material.

48. The method of concepts 26-47, 49 and 50, wherein said substrate comprises material selected from the group consisting of plastics, nylon and resin.

49. The method of concepts 26-48 and 50, wherein said substrate comprises semiconductor material.

50. The method of concepts 26-49, wherein said substrate comprises semiconductor material selected from the group consisting of silicon and gallium arsenide.

51. The apparatus of concepts 1-25, further comprising a relatively thick layer of high bandgap material adherent to the outer layer of said plurality of layers, wherein said high bandgap material has a band gap that is at least 5.0 eV.

52. The apparatus of concept 51, wherein said high bandgap material comprises an index of refraction that is at least 1.4, wherein said relatively thick layer has a thickness of at least >50 microns.

53. The method of concepts 26-50, further comprising adhering a relatively thick layer of high bandgap material to the outer layer of said plurality of layers, wherein said high bandgap material has a band gap that is at least 5.0 eV.

54. The method of concept 53, wherein said high bandgap material comprises an index of refraction that is at least 1.4, wherein said relatively thick layer has a thickness of at least >50 microns.

Additional Examples:

1. An optical device comprising:
    an optical structure comprising a grating, an interference coating, a multilayer thin film stack, a reflector, or a meta surface structure; and
    a bulk window disposed over the optical structure, the bulk window comprising a material having a band gap that is at least 5.0 eV and a thickness, the bulk window configured to increase the laser induced damage threshold of the underlying optical structure.

2. The optical device of example 1, wherein the bulk window material has a band gap that is from 5.0 eV to 10.0 eV.

3. The optical device of example 1 or 2, wherein the thickness of the bulk window material is at least 50 microns.

4. The optical device of example 3, wherein the thickness of the bulk window material is from 50 microns to 50,000 microns.

5. The optical device of any of the preceding examples, wherein the bulk window material has an index of refraction that is at least 1.02.

6. The optical device of example 5, wherein the index of refraction of the bulk window material is from 1.02 to 4.5.

7. The optical device of any of the preceding examples, wherein the bulk window material comprises silica, aluminum oxide, or diamond.

8. The optical device of any of the preceding examples, wherein the bulk window is 1 centimeter or less from the optical structure.

9. The optical device of any of the preceding examples, further comprising a gap between the optical structure and the bulk window.

10. The optical device of any of the preceding examples, wherein the optical structure is disposed within a recessed region formed by an underlying surface and one or more sidewalls, and wherein the bulk window is disposed over the recessed region to enclose the optical structure therein.

11. The optical device of example 10, wherein the recessed region is formed by a substrate and a raised edge.

12. The optical device of example 10 or 11, wherein the bulk window is bonded to the one or more sidewalls.

13. The optical device of example 12, wherein the bulk window is bonded to the one or more sidewalls via optical contacting or diffusion bonding.

14. The optical device of example 12, wherein the bulk window is bonded to the one or more sidewalls via mechanical bonding.

15. The optical device of any of the preceding examples, wherein the optical structure is disposed within a recessed region formed by the bulk window, and wherein the bulk window is disposed over the optical structure to enclose the optical structure therein.

16. The optical device of example 15, wherein the optical structure is disposed on a substrate, and the bulk window is bonded to the substrate.

17. The optical device of example 16, wherein the substrate comprising a central portion and an outer portion disposed around the central portion, wherein the optical structure is disposed on the central portion of the substrate, and the bulk window is bonded to the outer portion of the substrate.

18. The optical device of example 17, wherein the bulk window is bonded to the substrate via optical contacting or diffusion bonding.

19. The optical device of example 17, wherein the bulk window is bonded to the substrate via mechanical bonding.

20. The optical device of any of the preceding examples, wherein the bulk window is bonded to the optical structure.

21. The optical device of example 20, wherein the optical structure comprises a planarization layer.

22. The optical device of example 20 or 21, wherein the optical structure comprises a top surface having a central portion and an outer portion disposed around the central portion, wherein the bulk window is bonded to the outer portion of the top surface of the optical structure.

23. The optical device of any of examples 20-22, wherein the bulk window is bonded to the optical structure via optical contacting or diffusion bonding.

24. The optical device of any of examples 20-22, wherein the bulk window is bonded to the optical structure via mechanical bonding.

25. The optical device of any of the preceding examples, wherein the optical structure comprises a grating.

26. The optical device of any of the preceding examples, wherein the optical structure comprises an interference coating.

27. The optical device of any of the preceding examples, wherein the optical structure comprises a multilayer thin film stack.

28. The optical device of any of the preceding examples, wherein the optical structure comprises a reflector.

29. The optical device of example 28, wherein the reflector comprises a metallic coating.

30. The optical device of any of the preceding examples, wherein the optical structure comprises a meta surface structure.

31. The optical device of example 30, wherein the optical structure comprises a retarder.

32. The optical device of any of the preceding examples, wherein the bulk window has an anti-reflection coating.

33. The optical device of any of the preceding examples, wherein the bulk window has a bulk meta surface structure.

34. A method of fabricating an optical device, the method comprising:
   providing an optical structure comprising a grating, an interference coating, a multilayer thin film stack, a reflector, or a meta surface structure; and
   disposing a bulk window over the optical structure, the bulk window comprising a material having a band gap that is at least 5.0 eV and a thickness, the bulk window configured to increase the laser induced damage threshold of the underlying optical structure.

35. The method of example 34, wherein the bulk window material has a band gap that is from 5.0 eV to 10.0 eV.

36. The method of example 34 or 35, wherein the thickness of the bulk window material is at least 50 microns.

37. The method of example 36, wherein the thickness of the bulk window material is from 50 microns to 50,000 microns.

38. The method of any of examples 34-37, wherein the bulk window material has an index of refraction that is at least 1.02.

39. The method of example 38, wherein the index of refraction of the bulk window material is from 1.02 to 4.5.

40. The method of any of examples 34-39, wherein the bulk window material comprises silica, aluminum oxide, or diamond.

41. The method of any of examples 34-40, wherein the bulk window is 1 centimeter or less from the optical structure.

42. The method of any of examples 34-41, wherein disposing the bulk window comprises disposing the bulk window over a gap such that the gap is between the optical structure and bulk window.

43. The method of any of examples 34-42, further comprising disposing the optical structure within a recessed region formed by an underlying surface and one or more sidewalls, and wherein disposing the bulk window comprises disposing the bulk window over the recessed region to enclose the optical structure therein.

44. The method of example 43, wherein the recessed region is formed by a substrate and a raised edge.

45. The method of example 43 or 44, further comprising bonding the bulk window to the one or more sidewalls.

46. The method of example 45, wherein bonding the bulk window to the one or more sidewalls comprises bonding the bulk window to the one or more sidewalls via optical bonding or diffusion bonding.

47. The method of example 45, wherein bonding the bulk window to the one or more sidewalls comprises bonding the bulk window to the one or more sidewalls via mechanical bonding.

48. The method of any of examples 34-47, wherein the optical structure is disposed within a recessed region formed by the bulk window, and wherein the bulk window is disposed over the optical structure to enclose the optical structure therein.

49. The method of example 48, further comprising disposing the optical structure on a substrate, and bonding the bulk window to the substrate.

50. The method of example 49, wherein the substrate comprises a central portion and an outer portion disposed around the central portion, wherein the optical structure is disposed on the central portion of the substrate, and the bulk window is bonded to the outer portion of the substrate.

51. The method of example 50, wherein bonding the bulk window to the substrate comprises bonding the bulk window to the substrate via optical contacting or diffusion bonding.

52. The method of example 50, wherein bonding the bulk window to the substrate comprises bonding the bulk window to the substrate via mechanical bonding.

53. The method of any of examples 34-52, further comprising bonding the bulk window to the optical structure.

54. The method of example 53, wherein the optical structure comprises a planarization layer, and bonding the bulk window to the optical structure comprises bonding the bulk window to the planarization layer.

55. The method of example 53 or 54, wherein the optical structure comprises a top surface having a central portion and an outer portion disposed around the central portion, wherein bonding the bulk window to the optical structure comprises bonding the bulk window to the outer portion of the top surface of the optical structure.

56. The method of any of examples 53-55, wherein bonding the bulk window to the optical structure comprises bonding the bulk window to the optical structure via optical contacting or diffusion bonding.

57. The method of any of examples 53-55, wherein bonding the bulk window to the optical structure comprises bonding the bulk window to the optical structure via mechanical bonding.

58. The method of any of examples 34-57, wherein the optical structure comprises a grating.

59. The method of any of examples 34-58, wherein the optical structure comprises an interference coating.

60. The method of any of examples 34-59, wherein the optical structure comprises a multilayer thin film stack.

61. The method of any of examples 34-60, wherein the optical structure comprises a reflector.

62. The method of example 61, wherein the reflector comprises a metallic coating.

63. The method of any of examples 34-62, wherein the optical structure comprises a meta surface structure.

64. The method of example 63, wherein the optical structure comprises a retarder.

65. The method of any of examples 34-64, further comprising providing an anti-reflection coating on the bulk window.

66. The method of any of examples 34-65, wherein the bulk window has a bulk meta surface structure.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

What is claimed is:
1. An optical device comprising:
   an optical structure comprising a grating, an interference coating, a multilayer thin film stack, or a meta surface structure; and a bulk window disposed over the optical structure, the bulk window comprising a material having a band gap that is at least 5.0 eV and a thickness, the bulk window configured to increase a laser induced damage threshold of the optical structure.

2. The optical device of claim 1, wherein the bulk window material has a band gap that is from 5.0 eV to 10.0 eV.

3. The optical device of claim 1, wherein the thickness of the bulk window material is at least 50 microns.

4. The optical device of claim 3, wherein the thickness of the bulk window material is from 50 microns to 50,000 microns.

5. The optical device of claim 1, wherein the bulk window material comprises silica, aluminum oxide, or diamond.

6. The optical device of claim 1, wherein the bulk window is 1 centimeter or less from the optical structure.

7. The optical device of claim 1, further comprising a gap between the optical structure and the bulk window.

8. The optical device of claim 1, wherein the optical structure is disposed within a recessed region formed by an underlying surface and one or more sidewalls, and wherein the bulk window is disposed over the recessed region to enclose the optical structure therein.

9. The optical device of claim 8, wherein the recessed region is formed by a substrate and a raised edge.

10. The optical device of claim 8, wherein the bulk window is bonded to the one or more sidewalls.

11. The optical device of claim 1, wherein the optical structure is disposed within a recessed region formed by the bulk window, and wherein the bulk window is disposed over the optical structure to enclose the optical structure therein.

12. The optical device of claim 11, wherein the optical structure is disposed on a substrate, and the bulk window is bonded to the substrate.

13. The optical device of claim 12, wherein the substrate comprises a central portion and an outer portion disposed around the central portion, wherein the optical structure is disposed on the central portion of the substrate, and the bulk window is bonded to the outer portion of the substrate.

14. The optical device of claim 1, wherein the bulk window is bonded to the optical structure.

15. The optical device of claim 14, wherein the optical structure comprises a top surface having a central portion and an outer portion disposed around the central portion, wherein the bulk window is bonded to the outer portion of the top surface of the optical structure.

16. The optical device of claim 14, wherein the bulk window is bonded to the optical structure via optical contacting or diffusion bonding.

17. A method of fabricating an optical device, the method comprising:
    providing an optical structure comprising a grating, an interference coating, a multilayer thin film stack, or a meta surface structure; and
    disposing a bulk window over the optical structure, the bulk window comprising a material having a band gap that is at least 5.0 eV and a thickness, the bulk window configured to increase a laser induced damage threshold of the optical structure.

18. The method of claim 17, wherein the bulk window material has a band gap that is from 5.0 eV to 10.0 eV.

19. The method of claim 17, wherein the bulk window is 1 centimeter or less from the optical structure.

20. The method of claim 17, wherein disposing the bulk window comprises disposing the bulk window over a gap such that the gap is between the optical structure and bulk window.

* * * * *